UNITED STATES PATENT OFFICE.

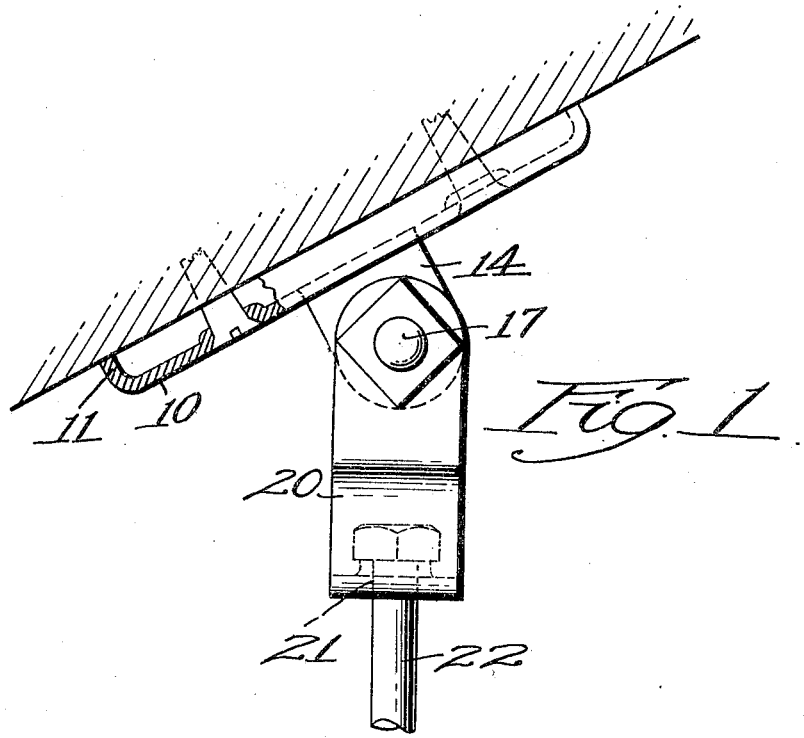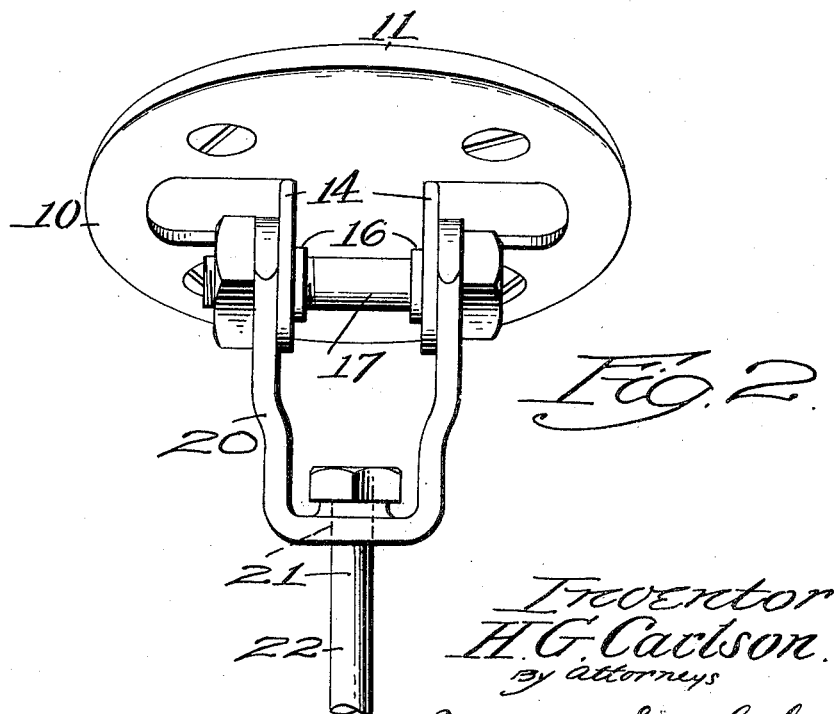

HJALMAR G. CARLSON, OF WORCESTER, MASSACHUSETTS, ASSIGNOR TO ROCKWOOD SPRINKLER COMPANY OF MASSACHUSETTS, OF WORCESTER, MASSACHUSETTS, A CORPORATION OF MASSACHUSETTS.

ADJUSTABLE PIPE-HANGER.

1,398,294. Specification of Letters Patent. Patented Nov. 29, 1921.

Application filed November 22, 1919. Serial No. 339,992.

*To all whom it may concern:*

Be it known that I, HJALMAR G. CARLSON, a citizen of the United States, residing at Worcester, in the county of Worcester and State of Massachusetts, have invented a new and useful Adjustable Pipe-Hanger, of which the following is a specification.

This invention relates to a pipe hanger for supporting a pipe from a hook and providing the attachment of the hook to the ceiling or other supporting surface.

The principal objects of the invention are to provide an improved form of pipe hanger adjustable about an axis so that the pipe can be hung from a surface located horizontally or in any other position; and to construct the attaching means in a most simple and inexpensive form.

The invention is in a sense an improvement over the patent to George I. Rockwood, No. 1,052.278 patented Feb. 4, 1919, and it involves the securing of the above mentioned objects without losing certain advantages of said Rockwood invention.

Reference is to be had to the accompanying drawings, in which

Figure 1 is a side view of a pipe hanger constructed in accordance with this invention shown as applied to an inclined surface and Fig. 2 is a front elevation thereof.

The supporting member for the pipe hanger consists of a flat plate 10 made of sheet metal of resilient qualities and stamped out with a surrounding flange 11 for engaging the surface against which it is to be secured. It is provided with screw holes arranged to have the same objects and functions as those shown in the above mentioned Rockwood patent.

For supporting the parts below, the flat central portion of this plate is provided with two perforations symmetrically located with respect to the center. The metal from each perforation is bent downwardly at right angles so as to come into parallel vertical position and form two lugs 14. These two lugs are perforated at their centers and the metal surrounding the perforations is turned in toward each other a slight distance at 16 to strengthen the lugs and form elongated bearings for the pivot bolt 17 which is supported in these bearings.

The pivot bolt carries a hook member 20 which is of a general U-shaped construction formed also of sheet stock and preferably of heavier material than the plate 10. The legs of this member engage the lugs 14 on their outer surfaces just under the head of the bolt and the nut for securing it. It is perforated at 21 at the bottom for supporting a pipe hook 22 as will be understood readily.

With this construction it will be seen that the screw holes are located between the central portion that supports the depending part of the device and the rim 11 so that the yield of the plate 10 can be made use of to enable the workman to securely fasten the plate in position under yielding pressure with its surrounding rim pressed firmly against the surface which is to support it.

It will be seen also that the lugs 14 are made without material expense for dies, etc. All the perforations can be made at one stamping and at very little expense for labor because they are placed in their final location merely by bending them into the position shown. No material obviously is sacrificed and the plate is not materially weakened by the perforations. At the same time the plate can be turned at any desired angle with respect to the pipe supporting hook.

Although I have illustrated and described only a single form of the invention, I am aware of the fact that many modifications can be made therein without departing from the scope thereof as expressed in the claim.

Therefore I do not wish to be limited to all the details of construction herein shown and described, but what I do claim is:—

A pipe hanger comprising a sheet metal supporting plate for attachment to a surface and having a surrounding rim adapted to engage that surface, and provided with screw holes for receiving attaching screws, the plate having two perforations therethrough, the metal cut out being bent at an angle to the plate into parallel position and perforated to form supporting lugs, a pivot bolt supported in the last-named perforations, and a hinge member pivoted on said bolt for supporting a pipe hook, said hinge member being of U-shaped construction and engaging the outer surfaces of said supporting lugs, and the metal surrounding that punched from the lugs, being forced inwardly so as to form a circular flange surrounding each perforation on the inner side to strengthen the lug and increase the length of the bearing for the bolt.

In testimony whereof I have hereunto affixed my signature.

HJALMAR G. CARLSON.